Patented Oct. 22, 1940

2,218,739

UNITED STATES PATENT OFFICE 2,218,739

COMPLEX PHENOLIC ESTER BASES AND SALTS THEREOF

Herman A. Bruson, Philadelphia, Pa., assignor to The Resinous Products & Chemical Company, Philadelphia, Pa.

No Drawing. Application November 12, 1938, Serial No. 240,009

6 Claims. (Cl. 260—404)

This invention relates to new complex phenolic ester bases and salts thereof and a process for preparing said compounds.

According to this invention, substances having useful properties are prepared by condensing any organic acyl halide of the aliphatic, arylaliphatic, alicyclic or heterocyclic series with a complex nitrogenous intercondensation product of a methylol-forming phenol, formaldehyde and a strongly basic, non-aromatic secondary amine. Such nitrogenous phenolic intercondensation products have been in part disclosed by the applicant in U. S. Patents Nos. 2,031,557; 2,033,092; 2,036,916; 2,040,039; 2,040,040; and 2,045,517; and may be oily, crystalline or even resinous in nature. The compounds directly obtained by the condensation of acyl halides and the above type complex nitrogenous phenolic intercondensation products are hydrohalide salts of phenolic esters containing aliphatically-bound tertiary amino groups. From these hydrohalide salts the free nitrogenous bases may be derived by neutralization of the hydrogen halide radical with alkali. From these free bases, in turn, quaternary ammonium salts may be formed by reaction with a suitable alkylating or aralkylating agent. Also various tertiary amine salts may be formed by addition of organic or inorganic acids to said free bases.

The water-soluble tertiary and quaternary ammonium salts of these new ester bases are useful as wetting, cleansing, emulsifying and dispersing agents that may be used in bleaching, dyeing, mordanting, mothproofing, and surface-treating fibrous materials such as cotton, cellulose, rayon, wool, silk, paper, feathers, hair and leather. Particularly valuable products are obtained when either the acyl halide employed or the nitrogenous phenolic intercondensate, or both, contain an aliphatic or alicyclic hydrocarbon group of 8 to 18 carbon atoms inclusive.

With due regard to the character of the complex nitrogenous condensate of the methylol-forming phenolic body employed for the process, as described above, the present invention is applicable to any monocarboxylic or polycarboxylic acid halide of the formula $R(COX)_n$ wherein R is any monovalent or polyvalent organic radical of the aliphatic, arylaliphatic, alicyclic, or heterocyclic series, $n$ is a small integer and X is halogen.

Typical acylating agents for the purpose are, for example, acetyl chloride, chloracetyl chloride, propionyl chloride, isobutyryl chloride, caproyl chloride, 2-ethyl hexoyl chloride, dodecanoyl chloride, oleic acid chloride, palmityl chloride, stearoyl chloride, crotonyl chloride, acrylyl chloride, methacrylyl chloride, undecenoyl chloride, naphthenic acid chloride, ricinoleic acid chloride, phenylacetyl chloride, tetrahydrofuroyl chloride, oxalyl chloride, chlorsuccinyl chloride, succinyl chloride, adipyl chloride, sebacyl chloride, linoleic acid chloride, octyloxyacetyl chloride, 4-ketostearoyl chloride, cinnamoyl chloride, p-ter-octylphenoxyacetyl chloride, campholic acid chloride, abietic acid chloride, α-bromstearoyl chloride, the corresponding acid bromides, and homologues thereof, or their obvious equivalents.

Typical complex phenolic-formaldehyde-secondary amine condensates which may be employed include the resinous as well as non-resinous tertiary nitrogenous condensation products of methylol-forming phenolic compounds with at least molecular equivalents each of formaldehyde and of strongly basic, non-aromatic, secondary amines of the aliphatic, alicyclic, or heterocyclic series, including amines having from 2 to 18 carbon atoms and upwards. Examples of suitable amines are dimethylamine, diethylamine, dibutylamine, diamylamine, diallylamine, methyl dodecylamine, methyl oleylamine, dicyclohexylamine, morpholine, piperidine, piperazine, diethanolamine, triethylene tetramine, and the like.

The phenols, which are reacted with formaldehyde and the above amines to furnish the complex nitrogenous condensate which is to be condensed with the acyl halide, are those aromatic hydroxy compounds which are capable of forming methylol derivatives with formaldehyde. These phenols in a broad way belong to the class of hydroxy or polyhydroxy aromatic compounds of either monocyclic or polycyclic structure, which contain at least one reactive nuclear position either ortho or para to the phenolic hydroxyl group. The phenols which meet these conditions and are operable in this intercondensation are termed "methylol-forming" phenols.

Typical examples of such phenols are:

Phenol; α- or β-naphthol; o-, m-, p-cresol; xylenol (1,2,4 and 1,3,5); ethyl phenol; the various straight or branched chain alkyl phenols such as propyl-, iso-propyl-, butyl-, amyl-, hexyl-, heptyl-, octyl-, nonyl-, undecyl-, dodecyl-, tetradecyl-, hexadecyl-, oleyl-, octadecyl-phenols; the cyclo-alkyl or aralkyl-phenols such as cyclohexyl-bornyl-, benzyl-, phenyl-phenols, and the nuclear alkyl, cycloalkyl, aralkyl, aryl, hydroxyl, nitro, acyl, acylamino, halogen, thio, sulfone, aryloxy or alkoxy derivatives thereof; including guaiacol, resorcinol, p-benzoyl phenol, pyrocatechol, pyrogallol, hydroquinone, p-acetylamino-phenol, o-, m-, p,p-chlorophenol, o-, m-, p-bromophenol, p,p'-dihydroxydiphenyl-dimethyl methane, p-hydroxy stearophenone, p-dodecanoylphenol, phenolic-formaldehyde resins in the "A" stage and other phenolic compounds such as p,p'-dihydroxydiphenyl sulfone, p,p'-dihydroxydiphenyl sulfide, p,p'-dihydroxydiphenyl sulfoxide, hydroxyanthracenes, hydroxyphenanthrenes, and their obvious equivalents.

The reaction between the acyl halide and the complex nitrogenous condensation product of formaldehyde, secondary amine, and the methylol-forming phenol may be carried out in the presence or absence of an inert organic solvent. The chief requirement of the process is that the acyl halide and the intercondensation product are mixed in such a way that the reaction between them is controlled. The permissible rate of addition of one reactant to the other will depend upon the temperature as well as on the nature of the particular reactants. In general, there is a wide range of temperatures at which the reaction may be carried out so long as no appreciable amount of insoluble resinous material results. The proportion of acyl halide required is at least one acyl halide group for each hydroxyl group to be esterified. As a result of the reaction, a product is obtained which is the hydrohalide salt of a phenolic tertiary amine, the phenolic hydroxyl group of which is esterfied by the acyl group. These complex ester salts are usually water-soluble compounds, the higher alkylated members of which in aqueous solution foam when shaken and show typical soap-like properties. Upon neutralization with a strong hydroxide the salt-forming radical is removed, and the free acylated complex phenolic bases are formed. These ester bases can, in the case of lower members, be distilled under reduced pressure without decomposition. The higher members are water-insoluble oils. Upon treatment with organic or inorganic acids, they form tertiary amine salts. With the common alkylating or aralkylating agents, such as diethyl sulfate, benzyl chloride, methyl iodide, ethyl chloracetate, β, β'-dichlordiethyl ether, allyl chloride, etc., they react to form quaternary ammonium salts. With hydrogen peroxide, they form amine oxides. The salts, most of which are water-soluble, are particularly useful as bactericides, mothicides, textile-softening agents, flotation agents, dyestuff fixatives, corrosion inhibitors, and mordanting, emulsifying, crease-proofing, wetting and cleansing agents, and are also useful for breaking certain types of petroleum and other emulsions.

The following examples illustrate this invention. In these examples, the designated complex condensation products of methylol-forming phenols, with at least molecular equivalent quantities each of formaldehyde and strongly basic secondary amine, were prepared as follows:

CONDENSATE A

To a solution of 94 g. of phenol in 125 g. of aqueous 36% commercial dimethylamine solution there was added dropwise 100 g. of aqueous 30% formaldehyde solution, the reaction mixture being stirred and cooled to about 30° C. The mixture was allowed to stand 24 hours at 25–30° C. and the lower oil layer drawn off and washed several times with water. It was then distilled under a vacuum of 13 mm. of mercury, and the fraction boiling at 97–103° C./13 mm. was collected. It was a pale reddish oil containing 8.9% nitrogen by analysis.

CONDENSATE B

To a mixture consisting of 300 g. of para-tertiary butyl-phenol and 396 g. of aqueous 25% dimethylamine solution in 150 cc. of ethanol there was added dropwise, the reaction mixture being stirred and cooled to 30–35° C., 220 g. of 30% formaldehyde solution. After the reaction mixture was stirred for four hours and allowed to stand for 18 hours at room temperature, the oil layer was separated, washed, and distilled under reduced pressure. The product distilled over at 150–160° C./12 mm. as a pale yellow oil which, upon redistillation, boiled at 145–150° C./5 mm. The yield was 342 g. of a colorless oil containing 6.4% nitrogen by analysis. It was soluble in dilute acetic acid.

CONDENSATE C

To a solution of 103 g. of p-α,α,γ,γ-tetramethylbutyl phenol (Jour. Amer. Chem. Soc. 55, 2571 (1933), in 100 cc. of 95% ethanol there was added 50 g. of aqueous 30% formaldehyde, and then with cooling to 30–40° C. and stirring, 56 g. of aqueous 41% dimethylamine solution was gradually added. The mixture was allowed to stand for 24 hours at room temperature. The lower oily layer was drawn off and allowed to crystallize in the cold. After recrystallization from 95% ethanol, it formed colorless prisms, M. P. 69° C., containing 5.3% nitrogen by analysis.

CONDENSATE D

To a solution of 19.4 g. of n-hexyl-resorcinol in 20 cc. of methanol, there was added 8.7 g. of morpholine. The solution was chilled to 10° C. and stirred while 8.1 g. of aqueous 37% formaldehyde solution was added dropwise. After standing 24 hours at 20–25° C., the mixture was chilled in an ice-salt bath until crystallization was complete. The condensation product was obtained in colorless crystals, which after recrystallization from petroleum ether melted at 93–94° C. The product contained 4.7% nitrogen by analysis, and was soluble in dilute lactic acid.

CONDENSATE E

To a solution of 94 g. of phenol in 100 cc. of water containing 105 g. of diethanolamine, 100 g. of aqueous 30% formaldehyde was added with cooling and stirring. After the reaction product had stood 24 hours, the water was distilled off in vacuo at 50° C. on a hot water bath. A pale yellow, very viscous oil was obtained.

CONDENSATE F

To a solution of 32.6 g. of 2,4-dichlorophenol, 60 cc. of methanol, and 21 g. of 30% formaldehyde solution there was added 36.2 g. of dicyclohexylamine, with stirring and cooling. The mixture was allowed to stand overnight and the crystalline product separated and purified by recrystallization from methanol containing water. It formed colorless crystals, M. P. 107° C., containing 3.97% nitrogen by analysis.

CONDENSATE G

To a solution of 41.2 g. of p-α,α,γ,γ-tetramethylbutyl phenol, 100 g. of 95% ethanol and 20 g. of aqueous 30% formaldehyde there was added 17.8 g. of piperidine (93% purity) with stirring and cooling. After standing 48 hours at room temperature, the crystalline product obtained was recrystallized from 95% ethanol. The resulting colorless crystals melted at 69° C. and contained 4.6% nitrogen by analysis.

Condensate H

To a solution of 122 g. of 1,3,5-xylenol in 60 cc. of methanol and 160 g. of 25% dimethylamine solution there was added 100 g. of 30% formaldehyde solution at 20-30° C. The two layers which formed on standing were separated after 48 hours. The lower oil layer crystallized yielding colorless crystals, M. P. 40-41° C.

The above condensates were employed as follows:

Example 1

To a solution of 45.3 g. of Condensate A in 125 cc. of methyl ethyl ketone there is added dropwise 60 g. of cocoanut oil fatty acid chlorides (mostly lauric acid chloride, obtained by treating mixed fatty acids of cocoanut oil with phosphorus trichloride) with stirring and cooling to 10-20° C. The clear solution obtained is then evaporated under reduced pressure on a steam bath to remove the solvent. The product obtained is a waxy mass which is the hydrochloride of the desired lauric ester base. It is soluble in water to form a soap-like solution which is useful as an emulsifying agent. By making such a solution alkaline with dilute sodium hydroxide solution in the cold, the free ester base separates as a pale yellow oil containing 4.14% nitrogen by analysis. It is soluble in dilute lactic or acetic acids to give foamy, soapy solutions having powerful dispersive properties. It combines with other organic or inorganic acids to form the corresponding phenolic ester amine salts.

For various purposes, such as fixing direct dyestuffs to the fiber, the quaternary ammonium salts of the above phenolic ester base are particularly useful. These are prepared by mixing 20 parts of the free ester base with 7.6 parts of benzyl chloride and heating the mixture at 90-95° C. for three hours. The product obtained is a viscous resin which, when dissolved in water, is capable of forming lakes with direct dyestuffs. It may also be used to give fabrics a soft, supple feel.

By using 10 g. of diethyl sulfate in place of the benzyl chloride as above, the corresponding water-soluble quaternary ammonium salt is obtained as a pale yellow oil. It dissolves in water to give a solution useful as a textile assistant.

Example 2

(a) 45.3 g. of Condensate A is dissolved in 150 cc. of methyl ethyl ketone and treated, as set forth in Example 1, with 90.8 g. of stearoyl chloride. The clear solution obtained is chilled to 0° C. and neutralized with a solution of 16.8 g. of potassium hydroxide in 100 cc. of alcohol, so that the temperature does not rise above 10° C. The mixture is stirred for 3 hours at this temperature and then filtered. The clear filtrate is evaporated on a steam bath under reduced pressure to remove solvent. The free base thus obtained is a pale yellow oil which is soluble in 10% lactic acid to give a viscous, foamy, soapy solution.

(b) Instead of stearoyl chloride, there is used 90 g. of oleic acid chloride and the product worked up as in (a) above. The free base is a pale reddish oil, which dissolves in dilute acetic acid to give a soapy solution.

(c) Instead of stearoyl chloride, there is used a molecular equivalent quantity of naphthenic acid chloride, and the product worked up as in (a) above. The free base is a pale reddish oil.

(d) Cinnamoyl chloride likewise yields an oily cinnamic acid ester.

The above described ester bases each form quaternary ammonium salts when heated to 100° C. with benzyl chloride, allyl bromide, dimethyl sulfate, sodium chloracetate, and other typical alkylating agents. The products can be used as textile finishing agents.

For example, 33.7 g. of the free base obtained in (c) above from naphthenic acid chloride and phenol-formaldehyde - dimethylamine (Condensate A) is mixed with 12.6 g. of benzyl chloride and heated for 2 hours at 90-95° C. A very viscous, water-soluble syrup is obtained. It is useful as an emulsifying agent.

Example 3

(a) To a solution of 62.1 g. of Condensate B in 150 g. of dry benzene, there is added gradually, with stirring, 53.5 g. of n-dodecanoyl chloride at a temperature of 30-40° C. After stirring for two hours, the solution is neutralized in the cold with 10% sodium hydroxide solution and the benzene layer separated, washed, dried and filtered. After removing the benzene by evaporation under reduced pressure, a pale yellow oil is obtained.

Its lactate and acetate are water-soluble, capillary-active salts.

By heating 34.9 g. of the above free ester base with 12.6 g. of benzyl chloride for four hours at 90-95° C., the corresponding quaternary ammonium salt is obtained as a lemon-yellow, viscous oil, which has useful wetting properties.

(b) To a solution of 195 g. of Condensate B in 300 g. of benzene there is added gradually at 15-20° C., with stirring, 74.3 g. of acetyl chloride. After the mixture has stood several hours, the solution is cooled to 5° C. and made faintly alkaline with dilute sodium hydroxide solution. The benzene layer is then separated, washed, dried, and distilled under reduced pressure. The acetyl ester formed boils at 135-140° C./6 mm. It is a colorless oil.

Example 4

To a solution of 26.3 g. of Condensate C in 80 cc. of benzene there is added gradually 7.8 g. of acetyl chloride, with stirring and cooling to 10° C. In a short time, the mixture sets to a crystalline paste of the acetyl ester hydrochloride, which is filtered off. It dissolves in water to give a foamy, soapy solution. Such a solution, containing 15 g. of the salt in 100 cc. of water, is neutralized in the cold with 10% sodium hydroxide solution. The acetyl ester of the phenolic free base separates as an oil which, when shaken out with ether, washed and distilled in vacuo, boils at 153-155° C./2 mm. It is a colorless oil.

The quaternary ammonium salt is obtained on heating a mixture of 87 parts of this oil with 36 parts of benzyl chloride at 90-100° C. for several hours. It is a colorless, hard, glassy mass which gives a foamy solution in water.

Example 5

(a) To a solution of 26.7 g. of Condensate C in 80 cc. of benzene, there is added gradually 13.5 g. of 2-ethyl butyryl chloride with cooling to 20° C. The clear solution obtained is evaporated to dryness under reduced pressure on a steam bath. The ester hydrochloride thus obtained is a colorless, crystalline mass.

A 25% solution of this ester hydrochloride is neutralized at 5° C. with 10% sodium hydroxide solution. The free ester base separates as a colorless oil, B. P. 160-165° C./2 mm. It forms quaternary ammonium salts when heated at 80–90° C. with methallyl chloride, benzyl chloride, methyl thiocyanate, β,β'-dichlordiethyl ether, or diethyl sulfate.

(b) By using 13.5 g. of n-caproyl chloride instead of 2-ethyl butyryl chloride in the procedure above, the corresponding free ester base is obtained. It is a colorless oil, B. P. 175–180° C./2 mm.

A mixture of 13 parts of this oil and 5.5 parts of diethyl sulfate is heated on a steam bath for six hours at 90–95° C. A viscous, glassy mass is formed, which gradually crystallizes.

(c) To a solution of 52.6 g. of Condensate C in 150 cc. of benzene there is gradually added 16 g. of succinyl chloride, with stirring and cooling to 20° C. After standing several hours at room temperature, sufficient 10% sodium hydroxide solution is added at 5–10° C. to give the initial pink color to henolphthalein indicator. The benzene layer is then separated with the aid of sodium acetate to break the emulsion. After the benzene layer is washed and dried, it is evaporated in vacuo on a steam bath. The free base is obtained as a viscous oil containing 4.3% nitrogen by analysis. It dissolves in dilute lactic or acetic acids to give clear, foamy, soapy solutions.

Example 6

To a solution of 27 g. of Condensate D in 100 cc. of benzene 8 g. of acetyl chloride is slowly added with stirring. The hydrochloride of the ester base thus formed is a water-soluble compound having bactericidal properties.

Example 7

To a solution of 21.1 g. of Condensate E in 75 cc. of methyl ethyl ketone there is added 20 g. of lauroyl chloride with stirring and cooling to 25–30° C. The small quantity of resinous product which separates is removed by filtration and the clear filtrate evaporated under reduced pressure on a steam bath. The residue is a pale yellow, sticky, viscous mass. It dissolves in water to give a foamy, soapy solution, and is not precipitated from solution by the addition of dilute lactic or acetic acid. Upon neutralization of the salt with dilute caustic soda solution, the free phenolic ester base separates as a pale yellow oil.

Example 8

To a solution of 18.2 g. of Condensate F in 80 cc. of benzene there is added gradually 7.2 g. of 2-ethyl butyryl chloride at 50° C. The white powder which separates is the hydrochloride of the ester base. It dissolves very slowly in water to give a solution useful for mothproofing woolens.

Example 9

To a solution of 30.3 g. of Condensate G in 100 cc. of benzene there is added slowly 9.5 g. of propionyl chloride with cooling to 15–20° C. After several hours of stirring the benzene is evaporated under reduced pressure, leaving a waxy, crystalline mass of the hydrochloride of the ester base. Upon neutralization of an aqueous solution of this salt with dilute caustic soda at 10° C., the free ester base separates as a colorless oil. Its acetate or lactate possesses useful capillary-active properties in aqueous solution.

Example 10

To a solution of 36 g. of Condensate H in 100 cc. of benzene there is added dropwise, with cooling and stirring, 41.2 g. of sec-octyloxyacetyl chloride, sec—$C_8H_{17}$—O—$CH_2COCl$. The jelly-like paste obtained is neutralized with 10% sodium hydroxide solution at 5–10° C. and the benzene layer separated. Upon evaporation of the benzene in vacuo on a steam bath, the free ester base is obtained as a pale yellow oil.

Example 11

To a solution of 26 g. of bis-(morpholino-metho)-resorcinol (prepared by condensing 2 molecular equivalents each of formaldehyde and morpholine with 1 mol of resorcinol, as described in U. S. Patent No. 2,040,040) dissolved in 250 cc. of hot methyl ethyl ketone, there is added 11 g. of 2-ethyl butyryl chloride, with stirring. The colorless crystalline mass which separates is the hydrochloride of the desired ester base. It is readily soluble in water and possesses bactericidal activity.

Variations in the above procedures are permissible. For example, the intercondensate of phenol, formaldehyde and amine may be added to the acyl chloride. Again while the combining of the reactants may be performed in the cold, the resulting mixture may be warmed to complete the reaction more rapidly. Intercondensates made with two or more molecular equivalents each of formaldehyde and secondary amines may be used in place of intercondensates made with equimolecular equivalents of phenol, formaldehyde and secondary amines. The general type of product from any of these modifications remains essentially the same. It is, therefore, to be understood that the scope of this invention is not to be limited by the examples given above.

The bases which are obtained by the reactions given above have the general structure—

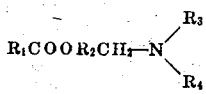

wherein $R_1$ represents an aliphatic, arylaliphatic, alicyclic or heterocyclic group, $R_2$ represents an aromatic nucleus having up to three condensed aromatic nuclei, and $R_3$ and $R_4$ represent members of the group consisting of aliphatic, alicyclic and heterocyclic radicals. It will be noted from the above examples that the aromatic nucleus may be substituted by many different sorts of groups. Phenols with more than one hydroxyl group may be used. The general formula above represents the simplest form of the esters resulting from the different reactants which are operable in the reaction. It is obvious that, when polyhydroxy phenols are used, more than one ester group may be introduced if it is so desired. Likewise, it is possible to combine more than one amino group with formaldehyde and suitable phenols.

I claim:

1. A process which comprises condensing (1) an acyl halide which is a member of the group of aliphatic, arylaliphatic, alicyclic, and heterocyclic acid halides, and (2) a nitrogenous intercondensation product of a methylol-forming phenol with formaldehyde and a strongly basic, non-aromatic secondary amine at a temperature below that at which the nitrogenous intercondensation product forms appreciable amounts of insoluble resin.

2. A process which comprises condensing (1) an acyl halide which is a member of the group of aliphatic, arylaliphatic, alicyclic, and heterocyclic acid halides, and (2) a nitrogenous intercondensation product of a methylol-forming phenol, formaldehyde and strongly basic, non-aromatic secondary amine, and subsequently neutralizing the reaction product with a base at a temperature below that at which the nitrogenous intercondensation product forms appreciable amounts of insoluble resin.

3. An ester of an acid of the group consisting of aliphatic, arylaliphatic, alicyclic, and heterocyclic carboxylic acids and a nitrogenous phenolic condensation product of a methylol-forming phenol, formaldehyde and a strongly basic, non-aromatic secondary amine.

4. An ester of a higher fatty acid and a phenolic nitrogenous condensation product of a methylol-forming phenol, formaldehyde and a strongly basic, non-aromatic secondary amine.

5. An ester of oleic acid and a phenolic nitrogenous condensation product of a methylol-forming phenol, formaldehyde and a strongly basic, non-aromatic secondary amine.

6. An ester of lauric acid and a phenolic nitrogenous condensation product of a methylol-forming phenol, formaldehyde and a strongly basic, non-aromatic secondary amine.

HERMAN A. BRUSON.